(12) United States Patent
Johnson (10) Patent No.: US 7,321,398 B2
(45) Date of Patent: Jan. 22, 2008

(54) DIGITAL WINDOWING FOR VIDEO SYNC SEPARATION

(75) Inventor: Dwayne G. Johnson, Flamborough (CA)

(73) Assignee: Gennum Corporation (CA)

( * ) Notice: Subject to any disclaimer, the term of this patent is extended or adjusted under 35 U.S.C. 154(b) by 557 days.

(21) Appl. No.: 10/935,874

(22) Filed: Sep. 8, 2004

(65) Prior Publication Data
US 2005/0052576 A1    Mar. 10, 2005

Related U.S. Application Data

(60) Provisional application No. 60/502,128, filed on Sep. 11, 2003, provisional application No. 60/502,028, filed on Sep. 11, 2003, provisional application No. 60/502,036, filed on Sep. 10, 2003, provisional application No. 60/501,792, filed on Sep. 10, 2003.

(51) Int. Cl.
*H04N 5/08*   (2006.01)
*H03L 7/00*   (2006.01)

(52) U.S. Cl. .................. 348/533; 348/536; 348/540

(58) Field of Classification Search ............. 348/533, 348/531, 536, 540, 541, 524, 546, 194; 386/46, 386/84, 124; 331/20, 1 A
See application file for complete search history.

(56) References Cited

U.S. PATENT DOCUMENTS

| | | | |
|---|---|---|---|
| 3,819,859 A | | 6/1974 | Borsuk et al. |
| 4,025,951 A | * | 5/1977 | Eckenbrecht ............ 348/548 |
| 4,097,896 A | | 6/1978 | Avery |
| 4,233,629 A | | 11/1980 | Dayton |
| 4,675,722 A | | 6/1987 | Hackett |
| 4,680,633 A | | 7/1987 | Gerdes et al. |
| 4,733,197 A | * | 3/1988 | Chow ....................... 331/1 A |
| 4,882,624 A | | 11/1989 | Sumiyoshi |
| 5,260,790 A | | 11/1993 | Takayama |
| 5,432,559 A | | 7/1995 | Bruins et al. |
| 5,486,869 A | | 1/1996 | Cooper |

(Continued)

FOREIGN PATENT DOCUMENTS

EP    0808062 B1    10/2002

(Continued)

OTHER PUBLICATIONS

Yu, Joseph, "Input Clock Generator (ICG 7051-1)—Preliminary Circuit Description and Test Procedures", Sep. 1977, pp. 23-26 with 42 pages of diagrams/drawings.

(Continued)

*Primary Examiner*—Victor R. Kostak
(74) *Attorney, Agent, or Firm*—Jones Day (57) ABSTRACT

A processing circuit for a sync signal includes a trial circuit and a windowing circuit. The trial circuit includes a counter that generates a count value proportional to the duration between successive sync pulses. When the count value reaches a trial sync spacing count value, a trial window signal is created and the counter is reset. If a predetermined number of subsequent sync pulses occur within the trial window signal, the sync spacing count value is confirmed and stored in a sync spacing register. The windowing circuit includes a counter that generates a count value proportional to the duration between successive window signals, and compares the count value to the value stored in the sync spacing register to generate a window signal. The window signal is compared with the sync signal pass valid sync signals.

20 Claims, 7 Drawing Sheets

U.S. PATENT DOCUMENTS

| | | | |
|---|---|---|---|
| 5,754,250 A | | 5/1998 | Cooper |
| 5,929,711 A | * | 7/1999 | Ito ............................ 331/1 A |
| 5,953,069 A | | 9/1999 | Bruins et al. |
| 6,154,256 A | * | 11/2000 | Bruins ........................ 348/533 |
| 6,330,034 B1 | * | 12/2001 | Renner et al. .............. 348/536 |
| 6,741,291 B1 | * | 5/2004 | Tsubaki ...................... 348/533 |
| 2001/0043283 A1 | * | 11/2001 | Renner ....................... 348/505 |
| 2005/0018080 A1 | * | 1/2005 | Renner et al. .............. 348/540 |

OTHER PUBLICATIONS

SCB-200N Schemicatic Diagram, Jun. 30, 1993, 6 diagrams.
Gennum Corporation, GS4882, GS4982 Video Sync Separators with 50% Sync Slicing Data Sheet, Jul. 2004, 7 pages.
Leitch, "DTG-1000N Digital Test Generator-Instruction Manual", pp. 1-15 with 29 pages diagrams/drawings.
The Grass Valley Group Inc., "Data Package, 9505 Color Black Sync Pulse Generator Module", Issue No. 1, 23 pages (includes drawings/diagrams).
The Grass Valley Group Inc., "SCB-200N Sync/Color Bar Generator" Manual No. TP7034-00-Issue No. 1, 9 pages.
"Input Sync Separator" ISS, BD4-A, 11 pages (includes drawings/diagrams).
National Semiconductor, LM1881, LM1881-X Video Sync Separator, Jun. 2003, pp. 1-12.
Intersil, Sync Separator, 50% Slice, S-H Filter, H out, Aug. 15, 2002, pp. 1-9.
Intersil, Sync Separator, 50% Slice, S-H Filter, Aug. 18, 2002, pp. 1-9.
Gennum Corporation, GS1881, GS4881, GS4981, Monolithic Video Sync Separators Data Sheet, Jul. 2004, pp. 1-14.
Leitch, DTG-1000N Digital Test Generator-Instruction Manual, 40 pages (includes drawings/diagrams).
Leitch 1000 GG Schematic 1981, 3 pages.
ICG Digital Video Systems 7051, 1979, 2 pages.
Digital Video Systems, DPS-1 Operators Manual, 555 pages.
Digital Video Systems Master Manual, Aug. 1976, 272 pages.

* cited by examiner

DIGITAL WINDOWING FOR VIDEO SYNC SEPARATION

This application claims the benefit of U.S. Provisional Application Ser. Nos. 60/502,036, entitled "Digital Windowing For Video Sync Separation," filed on Sep. 10, 2003; 60/501,792, entitled "Composite Color Frame Identifier System And Method," filed on Sep. 10, 2003; 60/502,028, entitled "Video Signal Sync Separator System And Method", filed on Sep. 11, 2003; and 60/502,128, entitled "Video Signal Format Detector And Generator System And Method," filed on Sep. 11, 2003. The entire disclosures of Application Ser. Nos. 60/502,036, 60/501,792, 60/502,028, 60/502,128 are incorporated herein by reference.

CROSS-REFERENCE TO RELATED APPLICATIONS

This application is related to United States Nonprovisional application Ser. No. 10/939,095 entitled "Video Signal Format Detector And Generator System And Method," filed on Sep. 10, 2004, now U.S. Pat. No. 6,972,803; and Ser. No. 10/935,875, entitled "Composite Color Frame Identifier System And Method," filed on Sep. 8, 2004, the entire disclosures of which are incorporated herein by reference.

BACKGROUND

This application relates in general to television signal processing systems and methods, and in particular to synchronization signal processing circuits and methods.

A composite video waveform comprises video data and synchronization ("sync") pulses. The sync pulses are extracted by a sync separator circuit and utilized to format the video data on a display device, such as a cathode ray tube. Glitches or noise in the composite video waveform, however, can be detected by the sync separator and mistaken for additional synchronization pulses. These false detections may cause timing errors in video signal processing devices.

Disclosed is an apparatus and method for identifying a pattern of synchronization pulses and for creating a window where each subsequent synchronization pulse should be located. Synchronization pulses that occur outside of this window are ignored to provide a clean and regular output stream of pulses. The apparatus and method may dynamically adjust to various video formats.

DETAILED DESCRIPTION

Figure 1:
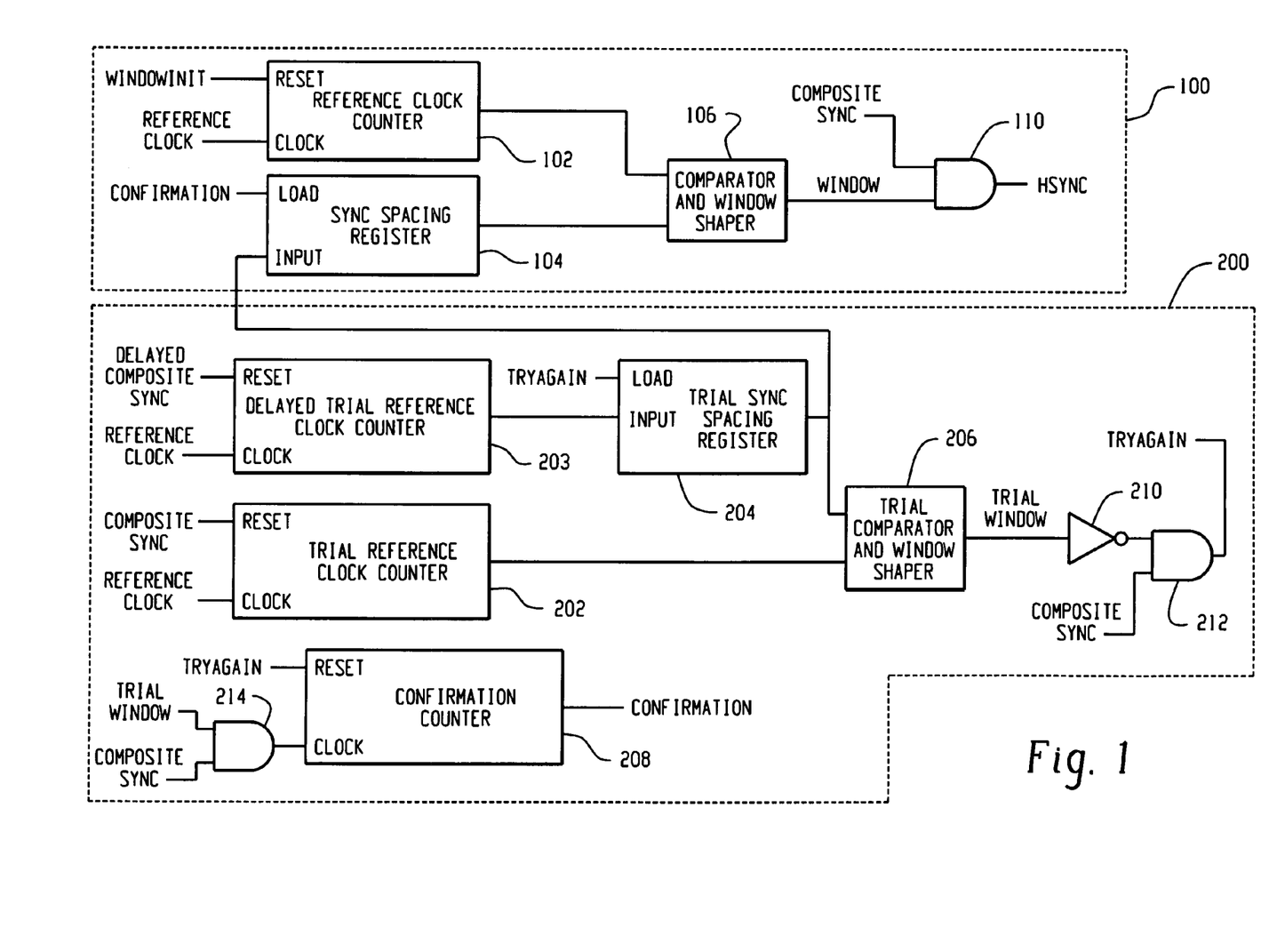
FIG. 1 is a block diagram of a windowing circuit for video synchronization signal processing.

FIG. 1 is a block diagram of a windowing circuit for video synchronization signal processing. The circuit of FIG. 1 is configured to receive a composite sync signal, or representation thereof, generated from an analog or digital video signal. This potentially noisy sync signal is provided to the circuit of FIG. 1 to generate a noise-free sync signal.

There are two main parallel blocks in FIG. 1, a window processing block 100 and a trial window processing block 200. In general, the window processing block 100 generates a window signal slightly before the expected time that a horizontal sync pulse is expected to occur. The timing at which the window signal begins is determined by a stored sync spacing value. The window signal is then used to gate sync pulses that occurs during the window signal time period.

The trial window processing block 200 determines and verifies the sync spacing value utilized by the window processing block 100. A count value corresponding to the time period between two successive sync pulses is measured and stored as a trial sync spacing value. Count values starting from successive composite sync pulses are then measured and compared to the trial sync spacing value and corresponding trial windows are generated. If a sync pulse is coincident with a trial window, a confirmation count is incremented. If the confirmation count is successively incremented beyond a predetermined confirmation count value, then the trial sync spacing value is confirmed and stored for use by the window processing block 100. Conversely, if a sync pulse is not coincident with a trial window before the confirmation count exceeds the predetermined confirmation count value, then the confirmation count value is reset, a new trial sync spacing value is obtained, and the confirmation process is repeated.

The window processing block 100 includes a reference clock counter 102, a sync spacing register 104, and a comparator and window shaper 106. The trial window processing block 200 includes a trial reference clock counter 202, a delayed trial reference clock counter 203, a trial sync spacing register 204, a trial comparator and window shaper 206, and a confirmation counter 208.

In operations, a reference clock is provided to the window processing block 100 and the trial window processing block 200 for timing. In the window processing block 100, the reference clock cycles are continuously counted by the reference clock counter 102, which outputs a count value. In one embodiment, the reference clock has a clock frequency of 27 MHz. The sync spacing register 104 stores a confirmed count value representative of a valid sync signal period. The confirmed count value is received from the trial window processing block 200.

The count value of the reference clock counter 102 is compared to the confirmed count value by the comparator and window shaper circuit 106. When the reference clock counter 102 count value reaches the confirmed count value of the sync spacing register 104, the comparator and window shaper 106 generates a window signal. The window signal is subsequently ANDed with the composite sync signal at AND gate 110 to generate the noise-free sync pulse train.

The window signal may be generated by a one-shot configured to trigger when the comparison of the count value of the reference clock counter 102 to the confirmed count value indicates that the count value of the reference clock counter 102 has reached the confirmed count value. The window pulse may be of a longer duration than the sync pulse to insure that the sync pulse may be detected during the window duration. In one embodiment, the confirmed count value stored in the sync spacing register 104 is less than the number of clock cycles defining the leading edges of two successive sync pulses so that the window signal is generated before the expected occurrence of a sync pulse in the composite sync signal.

The window signal may be used to generate a window initialization signal that is provided as a reset input to the reference clock counter 102 to reset the counter 102 for execution of another synchronization cycle. In one embodiment, the window signal is provided as an input to a window initialization signal generator.

The confirmed count value in the sync spacing register 104 is provided by the trial window processing block 200 after the value has been qualified. The trial circuit 200 has a trial reference clock counter 202 that continuously counts reference clock cycles, and is reset on each incoming composite sync pulse. The count value of the trial reference clock counter 202 is compared to a trial count value stored in a trial sync spacing register 204 by the trial comparator and window shaper 206. When the count value of the trial reference counter 202 reaches the trial count value in the trial sync spacing register 204, the trial comparator and window shaper 206 generates a trial window signal. The trial window signal may be generated by a one-shot configured to trigger when the comparison indicates that the count value of the trial reference clock counter 202 has reached the trial count value.

The trial window signal is inverted by an inverter 210 and ANDed with the composite sync signal by an AND gate 212 to generate a tryagain signal. Additionally, the trial window signal is ANDed with the composite sync signal by an AND gate 214 to generate a clock input for the confirmation counter 208.

The confirmation counter 208 is incremented for each successive sync pulse occurring within the trial windows that are generated. Upon the confirmation counter 208 reaching a predetermined confirmation count, a confirmation signal is generated, indicating that the value held in the trial sync spacing register 204 is valid. The confirmation signal is provided as a load input to the sync spacing register 104, which causes the value stored in the trial sync spacing register 204 to be stored in the sync spacing register 104. In the embodiment shown, a confirmation count of 24 is used to ensure that a confirmation signal will not be generated for sync pulses related to vertical synchronization for the various video standards supported by the system of FIG. 1.

If the composite sync pulse is not coincident with the trial window signal, then the tryagain signal goes high. In one embodiment, the composite sync pulse is not coincident with the trial window signal if the detected edge of the composite sync signal occurs outside the trial window signal. For a two-level sync signal, the detected edge may be the falling edge of the sync signal, and for a three-level sync signal, the detected edge may be the rising edge of the sync signal.

The tryagain signal is provided as a load input to the trial sync spacing register 204, which causes the trial sync spacing register 204 to be loaded with the delayed trial reference clock counter 203 each time the detected edge of the sync pulse occurs outside of the trial window. Likewise, the tryagain signal is provided as a reset input to the confirmation counter 208, which causes the confirmation counter to be reset. Thus, when the tryagain signal goes high, the confirmation count value is reset, a new trial sync spacing value is obtained, and the confirmation process is repeated until the count value stored in the trial sync spacing register is confirmed.

The tryagain signal will also be generated for vertical sync pulses, which occur at a higher frequency than horizontal sync pulses, and for noise spikes that occur between horizontal sync pulses. However, because the tryagain signal resets the trial reference clock counter 202, the confirmation count is not exceeded, thus precluding an invalid count from being transferred to the sync spacing register 104.

In one embodiment, the delayed trial reference clock counter 203 value is generated by the reference clock provided as a clock input and a delayed composite sync signal provided as a reset input. The delayed trial reference clock counter 203 value is thus less than the trial reference clock counter 202 at the time the tryagain signal goes high so that the count value stored in the trial sync spacing register 204 will cause the trial window to be generated at a time slightly preceding the next expected sync pulse.

Figure 2A:
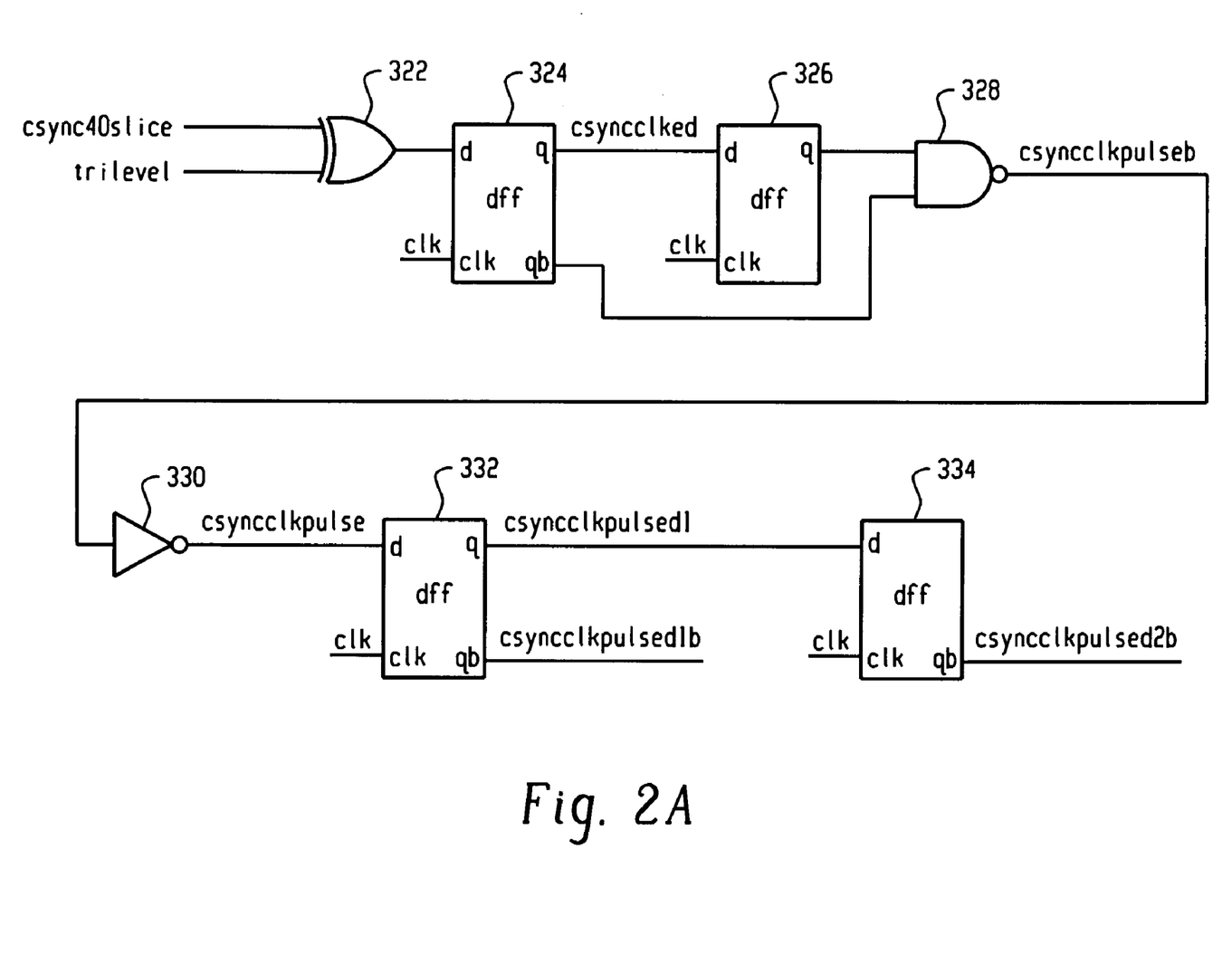
FIGS. 2A-2F are detailed circuit schematics of an example realization of the circuit of FIG. 1.
Figure 2B:
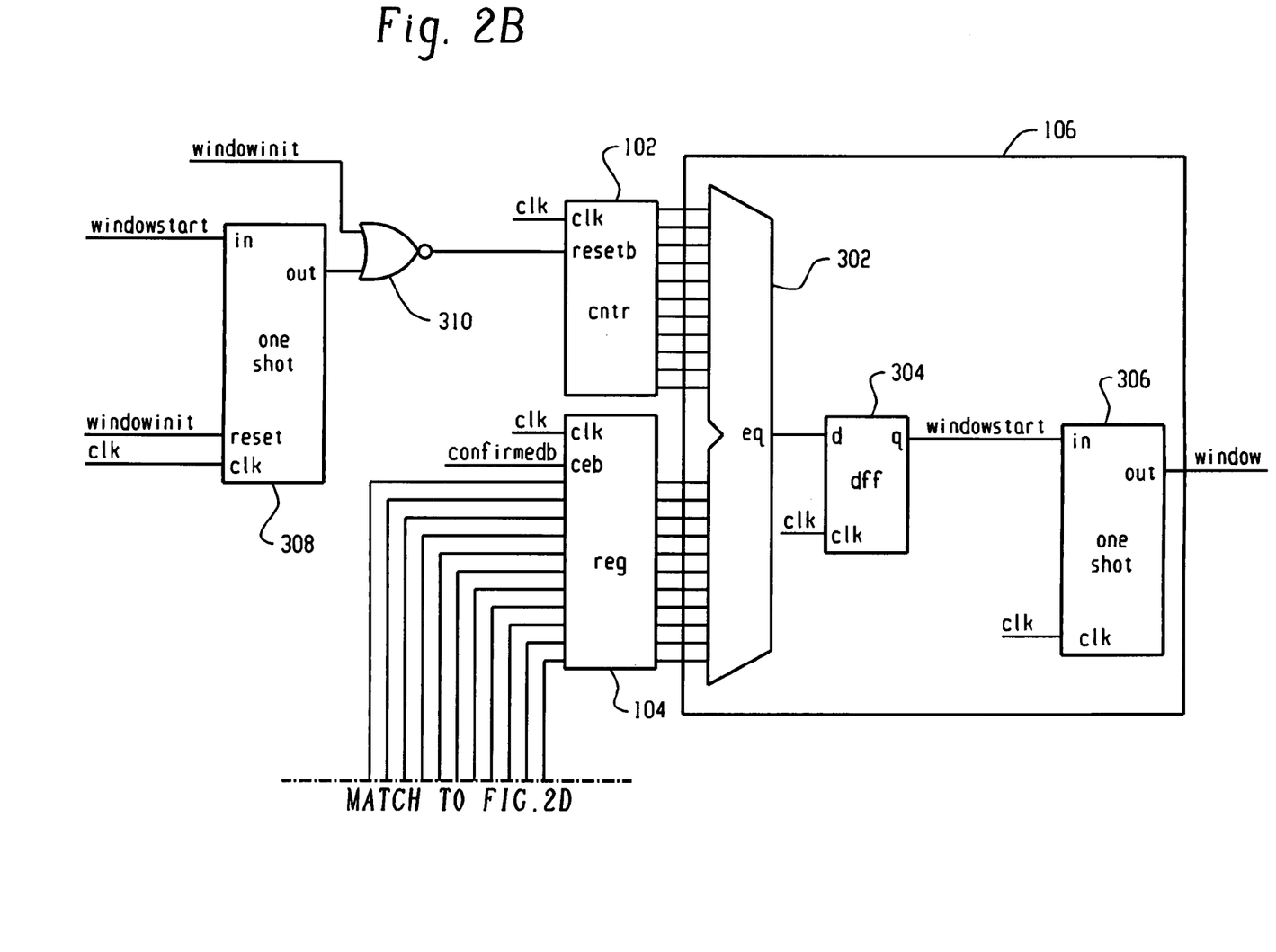
Figure 2C:
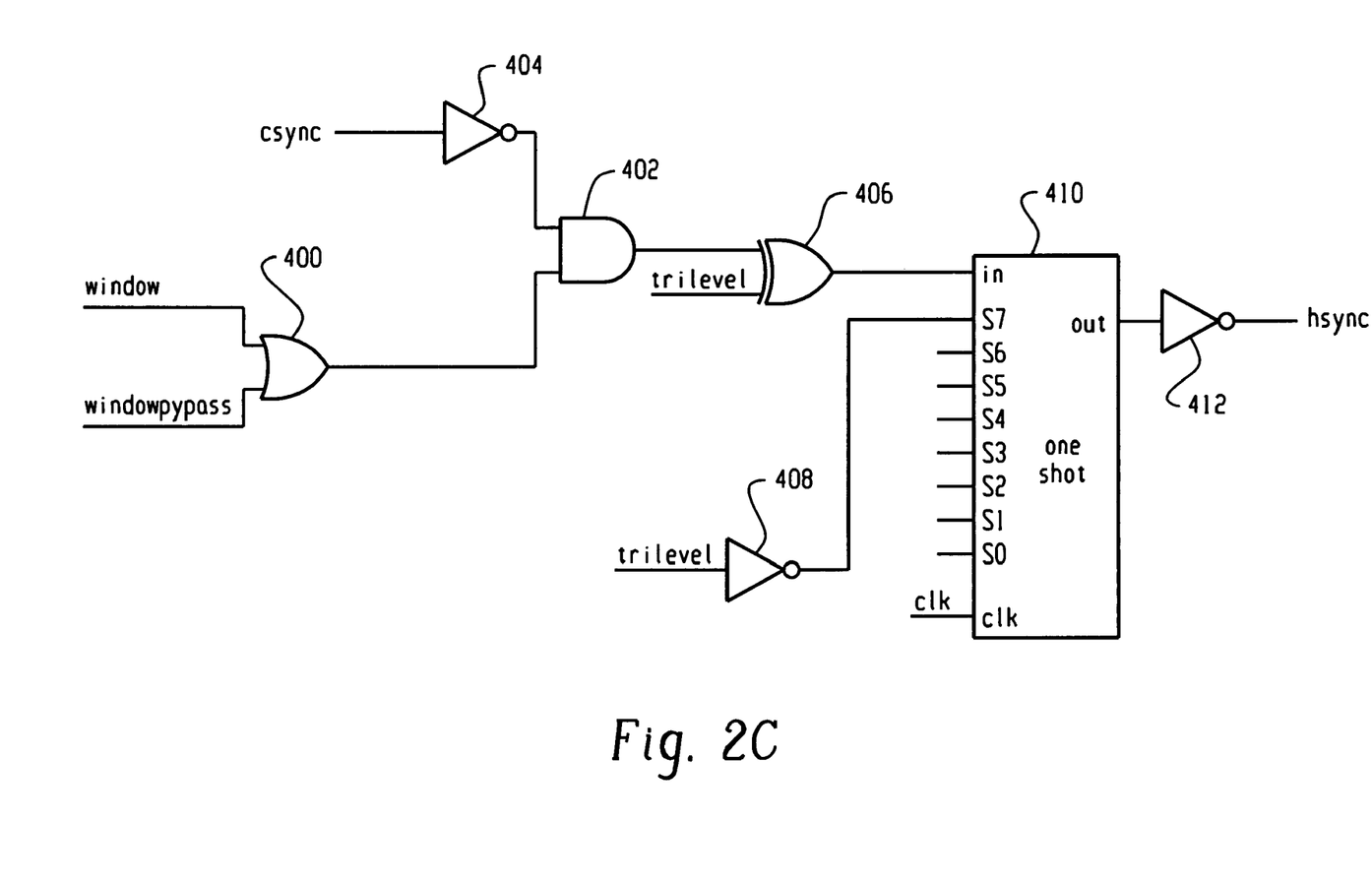
Figure 2D:
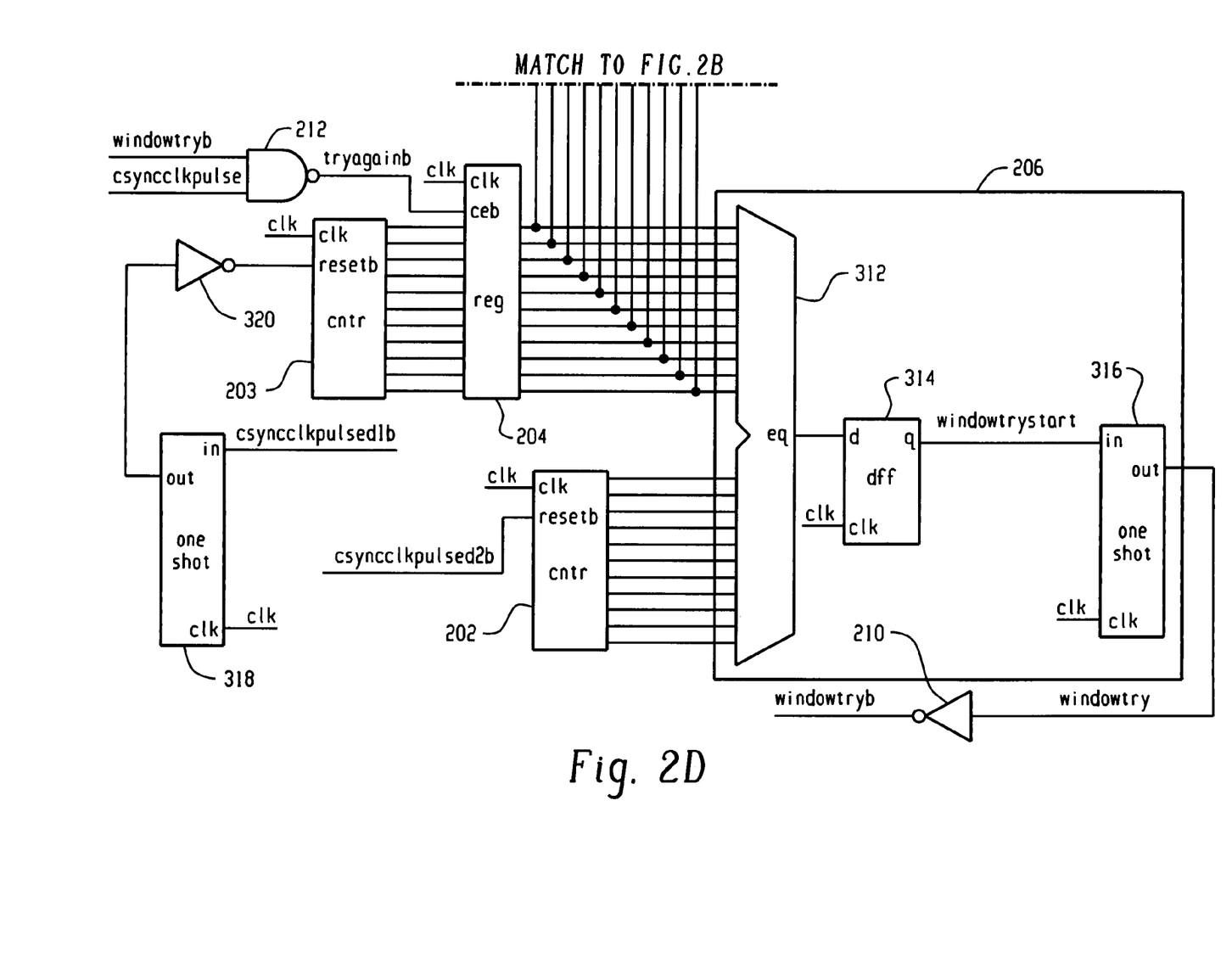
Figure 2E:
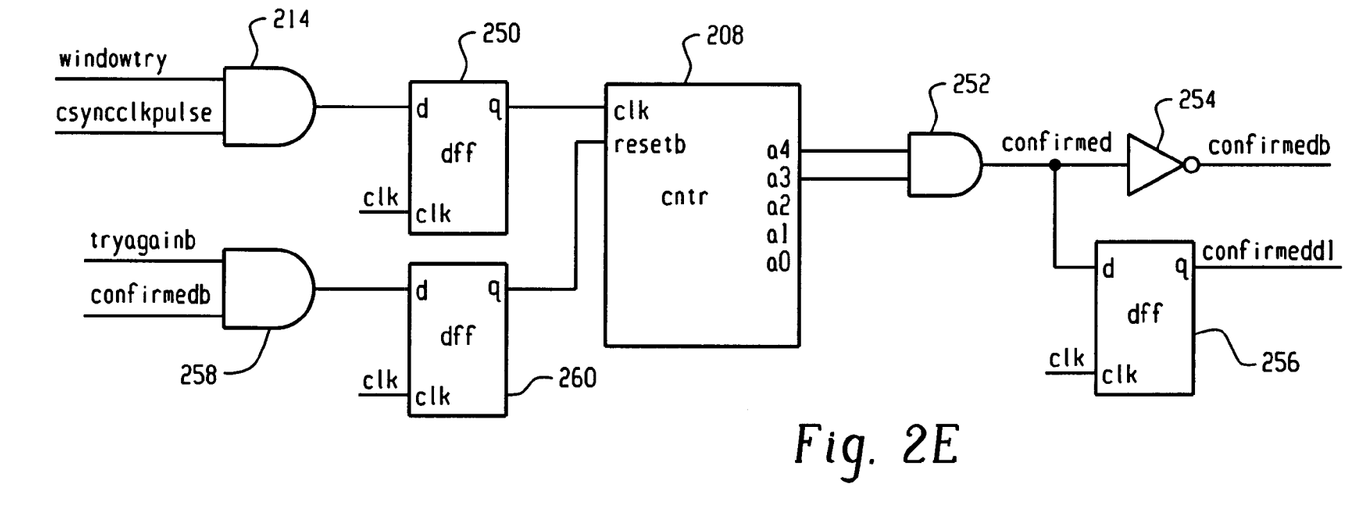
Figure 2F:
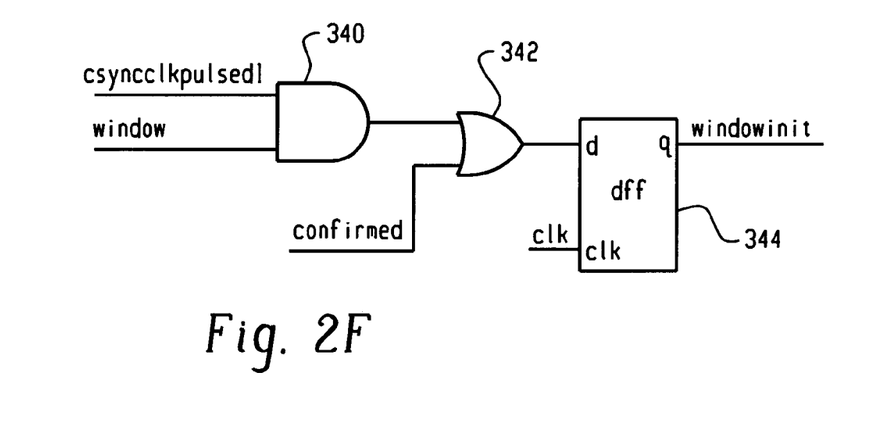

FIGS. 2A-2F are detailed circuit schematics of an example realization of the circuit of FIG. 1. Corresponding functional blocks of FIG. 1 are realized by similarly numbered components in FIG. 2. FIG. 2A depicts a processing circuit that is configured to generate delayed representations of the composite sync signal; FIGS. 2B and 2C depict an example implementation of the window processing block 100; FIGS. 2D and 2E depict an example implementation of the trial window processing block 200; and FIG. 2F depicts an example implementation of window initialization signal generator circuit.

The circuits of FIGS. 2B-2F utilize delayed representations of the composite sync signal. The delayed representations csyncnclkpulse, csyncclkpulsed1, csyncclkpulsed1b and csyncclkpulsed2b are generated by the example circuit of FIG. 2A. In the embodiment shown, each of these delayed representations are output pulses from flip-flops that are representative of the falling edge of a two-level sync pulse, or the rising edge of a three-level sync pulse. The delayed representations are provided to the circuits of FIG. 2B-2F at several delayed states to adjust for the latency in the circuit processing and to insure that the sync spacing count value stored in the sync spacing register 104 will result in the window signal being generated before the occurrence of a sync pulse in the composite sync signal.

As shown in FIG. 2A, an XOR gate 322 receives a version of the composite sync signal sliced at a 40% slicing level, csync40slice, and a trilevel logic signal. In the embodiment shown, the composite sync signal csync40slice is utilized in order to minimize false detections when slicing a three-level sync signal. Because the blanking level is the midpoint of a three-level sync signal, slicing at the 40% level results in fewer false detections.

The trilevel signal indicates whether a two-level or three-level sync pulse is being detected. When the trilevel signal is low, a two-level sync pulse is being detected, and when the trilevel signal is high, a three level sync pulse is being detected. The XOR gate 322 passes the csyns40slice signal when the trilevel signal is low, and generates an inverted version of the csync40slice signal when the trilevel signal is high. The XOR gate 322 thus provides for the generation of the delayed representations of csyncnclkpulse, csyncclkpulsed1b and csyncclkpulsed2b on the falling edge of a detected two-level composite sync pulse, or on the rising edge of a detected three-level composite sync pulse.

The output of the XOR gate 322 is provided as an input to a flip-flop 324, which generates a csyncclked signal. The csyncclked signal is provided as input to another flip-flop 326. The output of the flip-flop 326 and the inverted output of the flip-flop 324 are, in turn, provided as input to a NAND gate 328. The delay caused by the flip-flop 326 will result in a clock pulse signal csyncclkpulseb at the output of the NAND gate 328 that is representative of a falling edge of a two-level sync signal or a rising edge of a three-level sync signal. The clock pulse signal csyncclkpulseb is inverted by inverter 330 to produce a csyncclkpulse signal that is representative of a falling edge of a two-level sync signal or a rising edge of a three-level sync signal. The csyncclkpulse is provided to coupled flip-flops 332 and 334 to produce clock pulse signals csyncclkpulsed1, csyncclkpulsed1b and csyncclkpulsed2b, which are also representative of a falling edge of a two-level sync signal or a rising edge of a three-level sync signal.

As shown in FIG. 2B, a digital counter 102 is used to realize the reference clock counter 102, and a register 104 is used to realize the sync spacing register 104. The comparator and window shaper 106 is realized by a digital comparator 302, a flip-flop 304, and a one-shot 306. The digital comparator 302 receives the count value from the counter 102 and the confirmed count value stored in the register 104. When the count value from the counter 102 reaches the confirmed count value stored in the register 104, the output of the digital comparator 302 goes high, causing the flip-flop 304 to change state on the next clock cycle.

The output of the flip-flop 304 is a windowstart signal, which triggers the one-shot 306. The windowstart signal is fed back as an input to another one-shot 308, which causes the one-shot 308 to output a pulse. The presence of a pulse from the one-shot 308 or a windowinit signal at the input of NOR gate 310 causes the counter 102 to reset.

The window signal at the output of the one shot 306 and the composite sync signal csync are processed by the circuit of FIG. 2C to generate a horizontal sync pulse hsync. The composite sync signal csync is a version of the composite sync signal sliced at a 50% slicing level, and is logic 0 when the sync signal is present and at logic 1 when the sync signal is not present.

As shown in FIG. 2C, the window signal and a window-bypass signal are provided to an OR gate 400. The window-bypass signal may be generated to bypass the window signal. The output of the OR gate 400 is provided to an AND gate 402, which also receives an inverted version of the csync signal from inverter 404. Accordingly, if the window signal is low, then the output of the AND gate 402 will be low. Conversely, if the window signal is high and at least a portion of the sync pulse occurs when the window signal is high, then the output of the AND gate will go high during the presence of the sync pulse. Typically, however, the window signal begins before the sync pulse occurs and is eliminated after the sync pulse ends.

An XOR gate 406 receives the output of the AND gate 402 and a trilevel logic signal as input. The trilevel logic signal indicates whether a two-level or three-level sync pulse is being detected. When the trilevel signal is low, a two-level sync pulse is being detected, and when the trilevel signal is high, a three-level sync pulse is being detected. The XOR gate 406 passes the output of the AND gate 402 when the trilevel signal is low, and generates an inverted version of the output of the AND gate 402 when the trilevel signal is high. The XOR gate 406 thus provides for the generation of an hsync pulse on the falling edge of the detected two-level composite sync pulse, and provides for the generation of the hsync pulse on the rising edge of a detected three-level composite sync pulse.

The one-shot 410 is programmed to generate a corresponding hsync pulse based on the input received for the XOR gate 406. In the example circuit shown in FIG. 2C, programming inputs S0-S6 may be selected for a particular pulse width value for the hsync pulse. The duration of the hsync pulse is further adjusted by the output of the inverter 408, which generates an inverted version of the trilevel logic signal. Accordingly, the hsync pulse for the two-level composite sync signal is of longer duration than the hsync pulse for the three-level composite sync signal. Finally, an inverter 412 is used to invert the hsync signal so that a logic 0 value corresponds to the presence of a sync signal.

Operation of the trial window processing circuit 200 is now described with reference to FIGS. 2D and 2E. As shown in FIG. 2D, a pair of digital counters 202 and 203 are used to realize the trial reference clock counter 202 and the delayed trial reference clock counters, respectively, and a register 204 is used to realize the trial sync spacing register 204. The comparator and window shaper 206 is realized by a digital comparator 312, a flip-flop 314, and a one-shot 316.

The digital comparator 312 receives the count value from the counter 202 and the trial count value stored in the register 204. When the count value from the counter 202 reaches the trial count value stored in the register 204, the output of the digital comparator 312 goes high, causing the flip-flop 314 to change state on the next clock cycle. The output of the flip-flop 314 is a windowtrystart signal, which triggers the one-shot 316 to generate a windowtry signal.

An inverter 210 inverts the windowtry signal to generate a windowtryb signal. The windowtryb signal is provided as input to a NAND gate 212, which also receives as input the signal csyncnclkpulse, which is a delayed representation of the composite sync signal. If the signal csyncnclkpulse goes high when the window signal windowtry is low, then a sync pulse has occurred outside of a trial window. Accordingly, the trial count value stored in the register 204 is not a valid count value. The output signal tryagainb of the NAND gate 212 will thus go low and cause the register 204 to be loaded with the value of the counter 203.

The counter 203 is reset by the output of a one-shot 318 and an inverter 320. The one-shot 318, in turn, is triggered by the signal csyncclkpulsed1b, which is a delayed representation of the composite sync signal. Likewise, the counter 202 is reset by csyncclkpulsed2b, which is also a delayed representation of the composite sync signal.

If, however, the sync pulse is coincident with the trial window, then a confirmation count is incremented as previously described. FIG. 2E provides a detailed circuit schematic of an example confirmation counter circuit. An AND gate 214 receives the windowtry signal and the csyncclkpulse signals as input. If the csyncclkpulse goes high when the windowtry signal is high, the output of the AND gate 214 causes a flip-flop 250 to set on the next clock pulse, which, in turn, increments the counter 208. Once the counter 208 reaches a predetermined confirmation count value, the output of an AND gate 252 goes high to generate a confirmed signal. In the example circuit shown in FIG. 2E, the two most significant bits of a five bit counter are provided as input to the AND gate 252, which corresponds to a predetermined value of 24.

The confirmed signal is inverted by an inverter 254 to generate a confirmedb signal, and is also provided to a flip-flop 256 to generate a confirmedd1 signal. The confirmedb signal is provided as input to AND gate 258, which also receives the tryagainb signal as input. Thus, if the value in the 208 is not confirmed, the output of the AND gate 258 will go low when the tryagainb signal goes low. The output of the AND gate 258 is provided as input to the flip-flop 260, which, in turn, will cause the counter 208 to reset on the next clock cycle when the tryagainb signal goes low.

FIG. 2F is a detailed circuit schematic of a window initialization signal generator that is configured to generate the windowinit signal. An AND gate 340 receives the window signal and the csyncclkpulsed1 signal as input, and provides the logical output to an OR gate 342. The OR gate 342 also receives the confirmed signal as input. The output of the OR gate 342 is provided as input to the flip-flop 344, which, in turn, generates the windowinit signal. Thus, when the confirmed signal is high, or when the csyncclkpulsed1 and the window signal are high, the windowinit signal will be generated.

Figure 3:
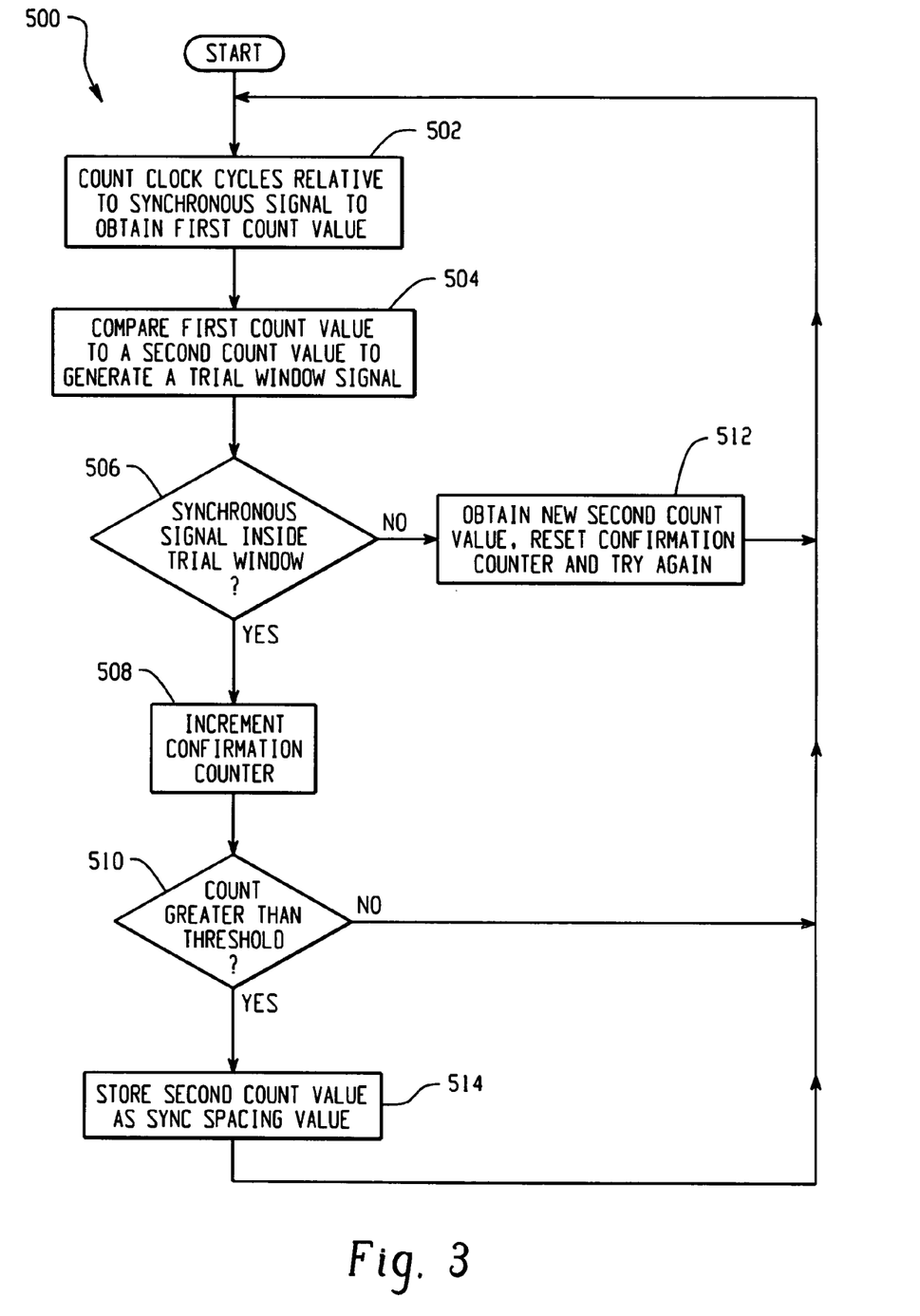
FIG. 3 is a flow diagram illustrating a method of processing a video synchronization signal.

FIG. 3 is flow diagram 500 illustrating a method of processing a video synchronization signal. In step 502, clock cycles relative to a sync signal are counted to obtain a first count value. The sync signal may be a sliced composite sync signal, or may be a representation of a portion of a sliced sync signal.

In step 504, the first count value is compared to a second count value to generate a trial window signal. The trial window signal may be generated when the first count value is equal to or exceeds the second count value.

In step 506, the trial window signal is compared to the sync signal to determine whether the sync signal is within the trial window signal. The trial window signal may be compared directly to the sync signal, or may be compared to a representation of a portion of the sync signal.

If the determination in step 506 is positive, then in step 508 the confirmation counter is incremented. Step 510 determines if the confirmation counter is greater than the confirmation count threshold. If so, then step 514 stores the second count value as a sync spacing value. The sync spacing value is then used for generating a window signal as described with respect to FIGS. 1 and 2 above. Conversely, if the confirmation counter is not greater than the confirmation count threshold, then the process returns to step 502.

If the determination in step 506 is negative, however, then a new second count value is obtained in step 512, the confirmation counter is reset, and the process returns to step 502.

The example windowing circuit described herein is digital-based and may use an arbitrary reference clock input. The digital implementation removes or minimizes processing variation problems that may affect the window placement or duration. The digital method may be correct to one clock cycle. Additionally, the digital circuitry can adaptively adjust to the horizontal synchronization rate, thus making the circuitry compatible with any horizontal scan rate standard. A variety of scan rates can be accommodated by adjusting the maximum counter value required for the reference clock frequency.

The above-described embodiments of the invention are intended to be examples only. Those of skill in the art may effect alterations, modifications and variations to the particular embodiments without departing from the scope of the invention.

What is claimed is:

1. A processing circuit for a sync signal, comprising:
a trial reference counter configured to receive a reference clock as a clock input and a first sync signal as a reset input and output a first count value;
a trial sync spacing register configured to store a second count value;
a trial window shaper circuit configured to receive the first count value and the second count value and generate a trial window signal when the first count value exceeds the second count value;
a confirmation counter circuit configured to receive a window clock as a clock input, generate a confirmation count based on the window clock, and generate a confirmation signal when the confirmation count exceeds a minimum value;
a reference counter configured to receive a reference clock as a clock input and an initialization signal as a reset input and output a third count value; and
a window shaper circuit configured to receive the third count value and the second count value and generate the window signal when the third count value exceeds the second count value;
wherein the window clock comprises a logic output operation based on the trial window signal and the first sync signal.

2. The processing circuit of claim 1, further comprising:
a sync signal generator circuit configured to receive the first sync signal and the window signal and generate a sync output signal when at least a portion of the first sync signal is coincident with the window signal.

3. The processing circuit of claim 2, wherein the sync signal generator is further configured to receive a trilevel logic signal indicative of two-level or three-level sync signal processing, and wherein the sync output signal corresponds to the detection of a falling edge of a two-level sync signal or the detection of a rising edge of a three-level sync signal.

4. The processing circuit of claim 2, wherein the sync signal generator circuit comprises a one-shot configured to generate an output sync pulse when at least a portion of the first sync signal is coincident with the window signal.

5. The processing circuit of claim 4, wherein the first sync signal comprises a composite sync signal in a television video signal, and the output sync pulse corresponds to a horizontal sync pulse in the television video signal.

6. The processing circuit of claim 1, further comprising:
a sync spacing register configured to store the second count value when the confirmation signal is generated by the confirmation counter circuit.

7. The processing circuit of claim 2, wherein the trial sync spacing register is configured to store the second count value when a detected edge of the first sync signal is not coincident with the trial window signal.

8. The processing circuit of claim 7, further comprising:
a delayed trial reference counter configured to receive the reference clock as a clock input and a delayed first sync signal as a reset input and output the second count value.

9. The processing circuit of claim 1, wherein the trial window shaper circuit comprises:
a digital comparator configured to receive the first count value and the second count value and generate an output signal representative of the first count value exceeding the second count value; and
a one-shot configured to generate the trial window signal in response to the output signal representative of the first count value exceeding the second count value.

10. The processing circuit of claim 1, wherein the window shaper circuit comprises:
a digital comparator configured to receive the third count value and the second count value and generate an output signal representative of the third count value exceeding the second count value; and
a one-shot configured to generate the window signal in response to the output signal representative of the third count value exceeding the second count value.

11. The processing circuit of claim 1, wherein the confirmation counter circuit is further configured to reset when a detected edge of the first sync signal is not coincident with the trial window signal.

12. A processing circuit for a sync signal, comprising:
a reference counter configured to receive a reference clock as a clock input and an initialization signal as a reset input and output a first count value;

a sync spacing register configured to receive and store a second count value upon receiving a confirmation signal;

a window shaper circuit configured to receive the first count value and the second count value and generate the window signal when the first count value exceeds the second count value; and a sync signal generator circuit configured to receive the sync signal and the window signal and generate a sync output signal when at least a portion of the sync signal is coincident with the window signal;

wherein the sync signal generator is further configured to receive a trilevel logic signal indicative of two-level or three-level sync signal processing, and wherein the sync output signal corresponds to the detection of a falling edge of a two-level sync signal or the detection of a rising edge of a three-level sync signal.

13. The processing circuit of claim 12, wherein the sync signal generator circuit comprises a one-shot configured to generate an output sync pulse when at least a portion of the sync signal is coincident with the window signal.

14. The processing circuit of claim 13, wherein the first sync signal comprises a composite sync signal in a television video signal, and the output sync pulse corresponds to a horizontal sync pulse in the television video signal.

15. A method of processing a sync signal, comprising:
counting clock cycles relative to a sync signal to obtain a first count value;
comparing the first count value to a second count value to generate a trial window signal;
comparing the trial window signal to the sync signal;
counting successive comparisons of the trial window signal to the sync signal in which the sync signal occurs within the trial window;
determining if the counted successive comparisons exceed a confirmation threshold;
upon determining that the counted successive comparisons exceed the confirmation threshold, storing the second count value as a sync spacing value; and
counting clock cycles relative to a delayed sync signal to obtain the second count value;
resetting the counted successive comparisons if the sync signal occurs outside the trial window; and
storing the second count value as a trial sync spacing value if the sync signal occurs outside the trial window.

16. The method of claim 15, further comprising:
counting clock cycles relative to a window signal to obtain a third count value;
comparing the third count value to a second count value to generate the window signal.

17. The method of claim 16, wherein the sync signal is a composite sync signal in a television signal, and further comprising comparing the window signal to the sync signal to generate a horizontal sync signal.

18. A system of processing a sync signal, comprising:
means for counting clock cycles relative to a sync signal to obtain a first count value;
means for comparing the first count value to a second count value to generate a trial window signal;
means for counting successive comparisons of the trial window signal to the sync signal in which the sync signal occurs within the trial window;
means for determining if the counted successive comparisons exceed a confirmation threshold;
means for storing the second count value as a sync spacing value upon determining that the counted successive comparisons exceed the confirmation threshold;
means for counting clock cycles relative to a delayed sync signal to obtain the second count value;
means for resetting the counted successive comparisons if the sync signal occurs outside the trial window; and
means for storing the second count value as a trial sync spacing value if the sync signal occurs outside the trial window.

19. A method of processing a sync signal, comprising:
counting clock cycles relative to a sync signal to obtain a first count value;
comparing the first count value to a second count value to generate a trial window signal;
comparing the trial window signal to the sync signal;
counting successive comparisons of the trial window signal to the sync signal in which the sync signal occurs within the trial window;
determining if the counted successive comparisons exceed a confirmation threshold;
upon determining that the counted successive comparisons exceed the confirmation threshold, storing the second count value as a sync spacing value;
counting clock cycles relative to a window signal to obtain a third count value; and
comparing the third count value to a second count value to generate the window signal.

20. The method of claim 19, wherein the sync signal is a composite sync signal in a television signal, and further comprising comparing the window signal to the sync signal to generate a horizontal sync signal.

* * * * *